(12) United States Patent
Huang et al.

(10) Patent No.: US 10,363,573 B2
(45) Date of Patent: Jul. 30, 2019

(54) VIBRATION MOTOR WITH DUAL U-SHAPED ELASTIC MEMBERS WITH FIXING PORTIONS TO A YOKE

(71) Applicant: AAC Technologies Pte. Ltd., Singapore (SG)

(72) Inventors: Jinquan Huang, Shenzhen (CN); Hongfu Xu, Shenzhen (CN); Xiang Xu, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 164 days.

(21) Appl. No.: 15/658,831

(22) Filed: Jul. 25, 2017

(65) Prior Publication Data

US 2018/0297074 A1 Oct. 18, 2018

(30) Foreign Application Priority Data

Apr. 14, 2017 (CN) .................... 2017 2 0397180 U

(51) Int. Cl.
*H02K 33/00* (2006.01)
*B06B 1/04* (2006.01)
(Continued)

(52) U.S. Cl.
CPC ............ *B06B 1/045* (2013.01); *H02K 7/1869* (2013.01); *H02K 7/1876* (2013.01);
(Continued)

(58) Field of Classification Search
CPC .. H02K 7/1869; H02K 7/1876; H02K 7/1892; H02K 33/00; H02K 33/02; H02K 33/16; B06B 1/04; B06B 1/045

USPC ........ 310/25, 15, 12.01, 81, 80, 321, 20, 21, 310/28–30, 36–37, 40 MM; 359/824; 381/400, 401, 402, 406, 413, 421

See application file for complete search history.

(56) References Cited

U.S. PATENT DOCUMENTS 7,671,493 B2 * 3/2010 Takashima .............. B06B 1/045
  310/12.16
7,755,227 B2 * 7/2010 Hirashima ............. H02K 33/16
  310/36

(Continued)

FOREIGN PATENT DOCUMENTS

CN  201520065695.1  *  1/2015  ............. H02K 33/00
CN  201520573253.8  *  7/2015  ............. H02K 33/00

*Primary Examiner* — Julio C. Gonzalez
*Assistant Examiner* — Maged M Almawri
(74) *Attorney, Agent, or Firm* — Na Xu; IPro, PLLC

(57) ABSTRACT

A vibration motor, including a shell, a vibrator and a stator accommodated in the shell, and an elastic member suspending the vibrator in the shell, one of the vibrator and the stator includes a magnetic circuit unit while the other one includes a coil. the elastic member is a sheet-like spring, and a plane where the elastic member is located is perpendicular to a vibrating direction of the vibrator, the elastic member is of a U-shape, and includes a first fixing portion and a second fixing portion respectively which are fixed to the vibrator and spaced from each other, a third fixing portion located between the first fixing portion and the second fixing portion and fixed to the shell, a first deforming portion connecting the third fixing portion with the first fixing portion, and a second deforming portion connecting the third fixing portion with the second fixing portion.

9 Claims, 5 Drawing Sheets

(51) Int. Cl.
    *H02K 7/18* (2006.01)
    *H02K 33/02* (2006.01)
    *H02K 33/16* (2006.01)

(52) U.S. Cl.
    CPC .......... *H02K 7/1892* (2013.01); *H02K 33/02* (2013.01); *H02K 33/16* (2013.01)

(56) References Cited

U.S. PATENT DOCUMENTS

| | | | |
|---|---|---|---|
| 9,225,265 B2* | 12/2015 | Oh | B06B 1/0644 |
| 10,063,128 B2* | 8/2018 | Wang | H02K 33/16 |
| 2007/0216235 A1* | 9/2007 | Lee | H02K 33/16 |
| | | | 310/36 |
| 2014/0070667 A1* | 3/2014 | Oh | B06B 1/0644 |
| | | | 310/326 |
| 2015/0194870 A1* | 7/2015 | Kim | H02K 33/18 |
| | | | 310/25 |
| 2016/0226365 A1* | 8/2016 | Wang | H02K 33/16 |
| 2017/0033657 A1* | 2/2017 | Mao | H02K 33/16 |
| 2018/0071778 A1* | 3/2018 | Mori | B06B 1/045 |
| 2018/0278136 A1* | 9/2018 | Odajima | B06B 1/045 |

* cited by examiner

VIBRATION MOTOR WITH DUAL U-SHAPED ELASTIC MEMBERS WITH FIXING PORTIONS TO A YOKE

TECHNICAL FIELD

The present disclosure relates to the field of vibration motors and, particularly, to a vibration motor.

BACKGROUND

With the arrival of the mobile internet era, the number of smart mobile devices is continuously increasing. Among numerous mobile devices, cellphone is undoubtedly the most common and most portable mobile device. At present, a cellphone has diversified functions, one of which is high-quality music playing. A vibration motor, which drives cellphone screen to sound, is necessary to achieve the high-quality music playing.

In the related art, an elastic member in the vibration motor is usually of an "S" shape, which is respectively provided on both sides of a vibrator in a vibrating direction. One end of the elastic member is directly fixed to the vibrator, and the other end of the elastic member is directly fixed to a shell. In such a structure, on the one hand, high precision is required on the elastic member, and thus the elastic member is difficult to process, especially the connection area between the vibrator and the elastic member is difficult to be formed. On the other hand, since only one end of the elastic member is fixed to the vibrator, the vibrator may not vibrate stably.

Therefore, it is necessary to provide a new a vibration motor to solve the above problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further described with reference to the accompanying drawings and embodiments.

Figure 1:
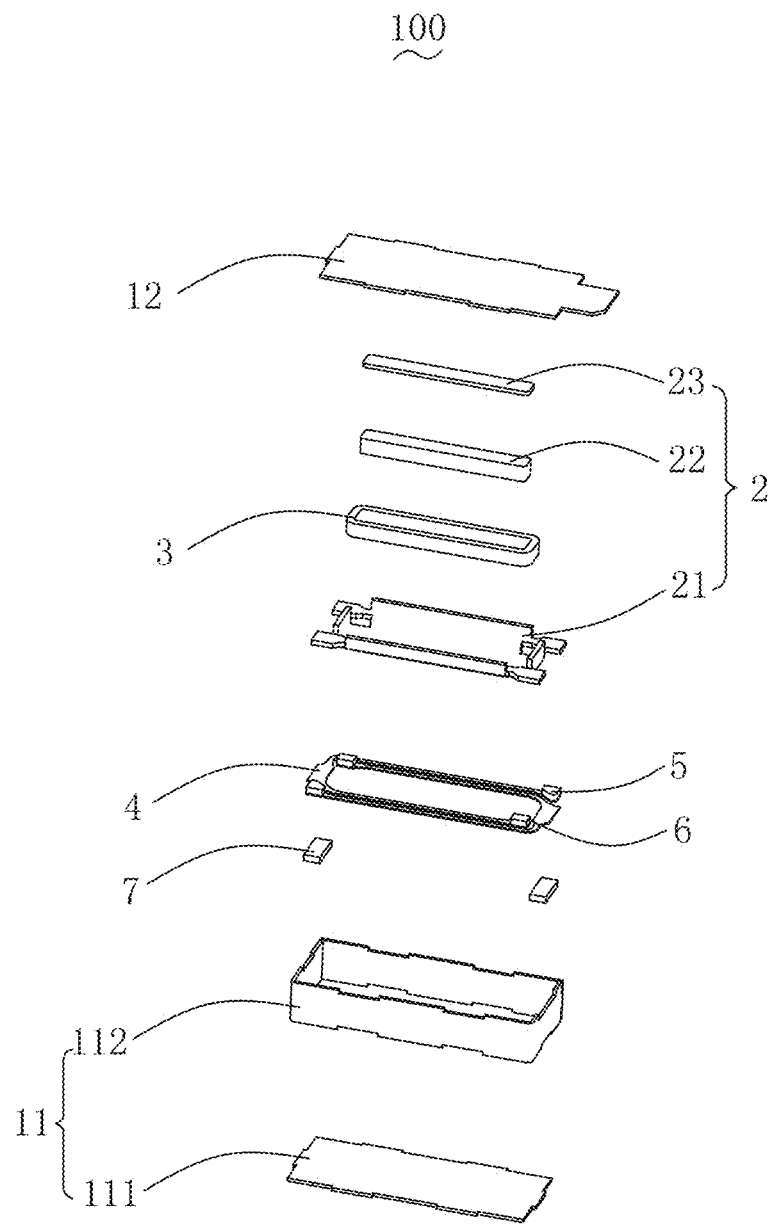
FIG. 1 is an exploded perspective structural view of a vibration motor in accordance with an exemplary embodiment of the present disclosure.
Figure 2:
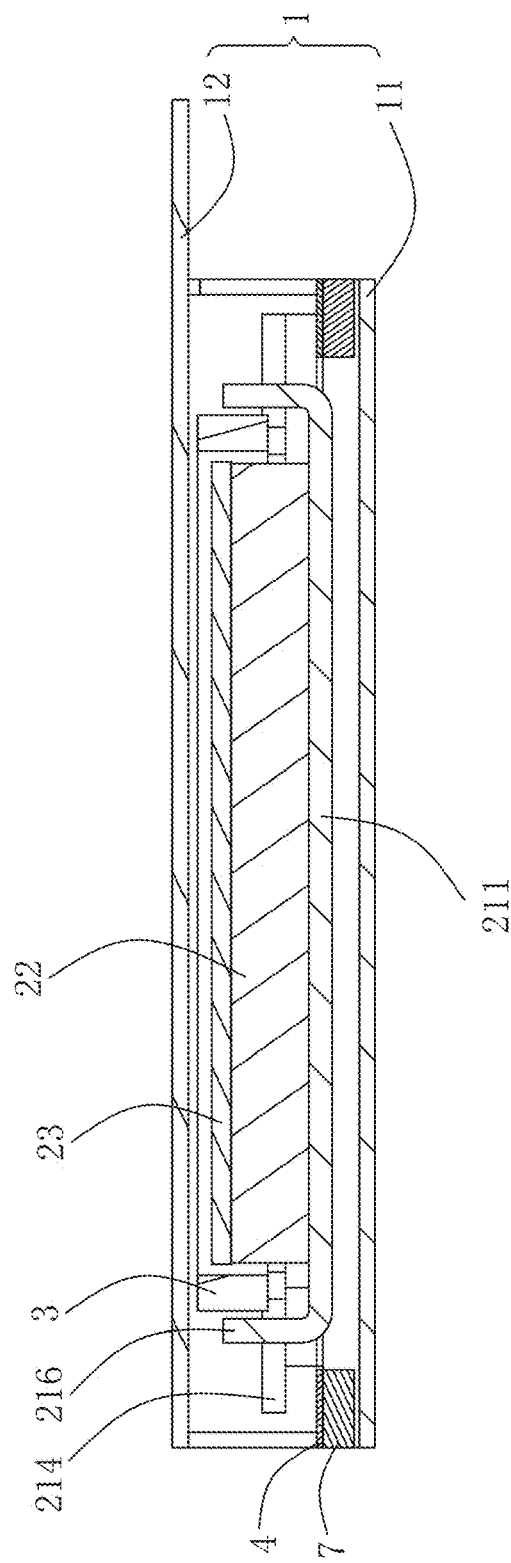
FIG. 2 is a sectional view of a vibration motor in accordance with an exemplary embodiment of the present disclosure.

With reference to FIG. 1 and FIG. 2, FIG. 1 is an exploded perspective structural view of a vibration motor in accordance with an exemplary embodiment of the present disclosure; FIG. 2 is a sectional view of a vibration motor in accordance with an exemplary embodiment of the present disclosure. The vibration motor 100 includes a shell 1, a vibrator (not labeled) accommodated in the shell 1, a stator (not labeled) that drives the vibrator to vibrate, an elastic member 4 which suspends the vibrator in the shell 1, a first fixing member 5, a second fixing member 6 and a third fixing member 7. The first fixing member 5, the second fixing member 6 and the third fixing member 7 are configured to fix the elastic member 4.

The shell 1 includes a housing 11 and a cover plate 12 which covers the housing 11. The housing 11 includes a bottom plate 111 and a side plate 112 surrounding the periphery of the bottom plate 111. In an exemplary embodiment, the side plate 112 is provided separately from the bottom plate 111. By configuring the housing 11 as a separated structure, the vibration motor can be easily processed.

One of the vibrator and the stator includes a magnetic circuit unit 2, and the other one of the vibrator and the stator includes a coil. For ease of description, in an exemplary embodiment, the vibrator consists of the magnetic circuit unit 2, the stator includes the coil 3, and the coil 3 is fixed to the shell 1. Specifically, the coil 3 is fixed to the cover plate 12. The coil 3 interacts with the magnetic circuit unit 2 to drive the vibrator to vibrate.

The magnetic circuit unit 2 includes a yoke 21 accommodated in the shell 1, a magnet 22 fixed to the yoke 21, and a pole plate 23 fixed to a side of the magnet 22, the side of the magnet 22 faces away from the yoke 21. The coil 3 is arranged by winding the magnet 22.

Figure 3:
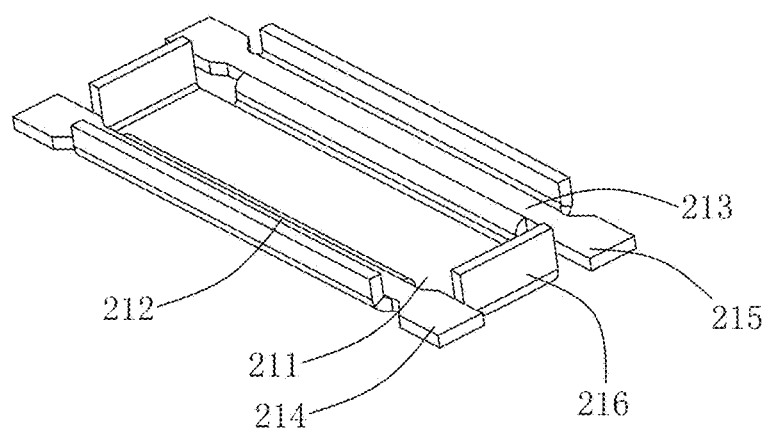
FIG. 3 is a perspective view of a yoke of a vibration motor in accordance with an exemplary embodiment of the present disclosure.

With reference to FIG. 3, FIG. 3 is a perspective view of a yoke of a vibration motor in accordance with an exemplary embodiment of the present disclosure. The yoke 21 includes a main portion 211 fixedly connected with the magnet 22, a first bending portion 212 and a second bending portion 213 respectively bending and extending from two opposite sides of the main portion 211 in a direction to the cover plate 12, a first extending portion 214 and a second extending portion 215 respectively extending from two ends of the first bending portion 212 and the second bending portion 213 in a direction to the housing 11, and two side walls 216 respectively bending and extending from two opposite sides of the main portion 211 in a direction to the cover plate 12. Specifically, the first extending portion 214 and the second extending portion 215 are formed by respectively extending from two sides of the first bending portion 212 and the second bending portion 213 in a direction to the side plate 112. The coil 3 is clamped between two side walls 216, so that the coil 3 is located inside of the yoke 21 when the vibrator vibrates.

Figure 4:
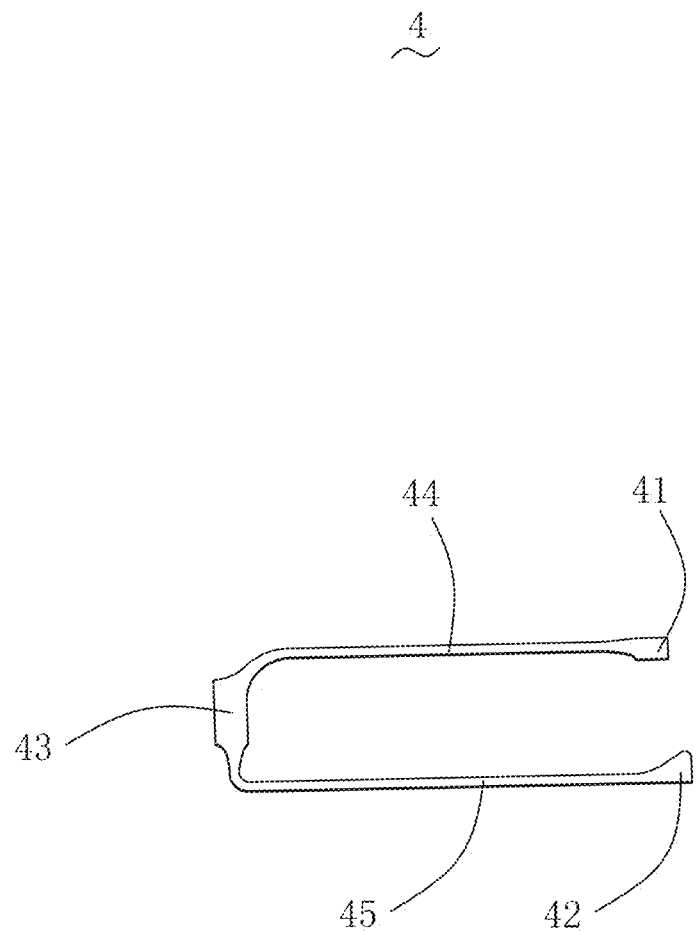
FIG. 4 is a perspective view of an elastic member of a vibration motor in accordance with an exemplary embodiment of the present disclosure.

With reference to FIG. 4, FIG. 4 is a perspective view of an elastic member of a vibration motor in accordance with an exemplary embodiment of the present disclosure. The elastic member 4 includes a first fixing portion 41 and a second fixing portion 42 fixedly connected with the yoke 21 respectively, a third fixing portion 43 located between the first fixing portion 41 and the second fixing portion 42 and fixedly connected with the shell 1, a first deforming portion 44 which connects the third fixing portion 43 with the first fixing portion 41, and a second deforming portion 45 which connects the third fixing portion 43 with the second fixing portion 42. The first fixing portion 41 and the second fixing portion 42 are respectively located at two ends of the elastic member 4, the third fixing portion 43 is located in a middle portion of the elastic member 4. The vibrator and the elastic member 4 can be connected stably by fixing two ends of the elastic member 4 to the yoke 21 and fixing the middle portion of the elastic member 4 to the shell 1, so that the vibration is stable.

In an exemplary embodiment, the elastic member 4 is a sheet-like spring, and the elastic member 4 presents a U-shape, the plane where the elastic member 4 is located is perpendicular to a vibrating direction of the vibrator. By configuring the elastic member 4 as the above-described structure, the shape of the elastic member is simple and, the elastic member can be easily processed. Since the plane where the elastic member 4 is located is perpendicular to the vibrating direction of the vibrator, space in a vertical direction can be saved.

Figure 5:
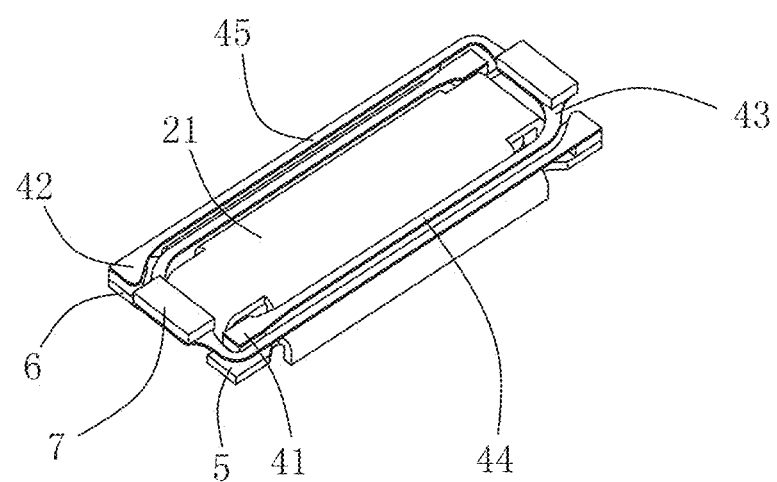
FIG. 5 is a partial structural schematic view of a vibration motor in accordance with an exemplary embodiment of the present disclosure.

With reference to FIG. 5, FIG. 5 is a partial structural schematic view of a vibration motor in accordance with an exemplary embodiment of the present disclosure. Two elastic members 4 are provided, and the two elastic members 4 are respectively fixed to a side of the yoke 21, the side of the yoke 21 faces away from the coil 3. The third fixing portions 43 corresponding to two elastic members 4 are arranged directly facing each other. The first deforming portion 44 and the second deforming portion 45 of two elastic members are parallel to and spaced from each other. Two elastic members 4 are coplanar, which saves space in a vertical direction.

In addition, the first deforming portion 44 of any one of two elastic members 4 is located between the first deforming portion 44 of the other one of two elastic members 4 and the second deforming portion 45 of the other one of two elastic members 4. By configuring the elastic member 4 as the above-described structure, installation space of the elastic member 4 can be saved.

In an exemplary embodiment, two elastic members 4 can be respectively named as a first elastic member and a second elastic member. Thus, the third fixing portions 43 of the first elastic member and the second elastic member are arranged oppositely facing each other, the first deforming portions 44 and the second deforming portions 45 of the first elastic member and the second elastic member are arranged parallel to and spaced from each other. The first elastic member and the second elastic member are coplanar, so as to save space in the vertical direction. The first deforming portion 44 of the second elastic member is located between the first deforming portion 44 of the first elastic member and the second deforming portion 45 of the first elastic member. The second deforming portion 45 of the second elastic member is located at a side of the second deforming portion 45 of the first elastic member, and the side of the second deforming portion 45 of the first elastic member is close to the shell 1.

The first fixing member 5 is fixed to the first extending portion 214, the second fixing member 6 is fixed to the second extending portion 215. Specifically, the first fixing portion 41 of the elastic member 4 is fixedly welded to the first fixing member 5, the second fixing portion 42 is fixedly welded to the second fixing member 6, the third fixing portion 43 is fixedly welded to the third fixing member 7. By configuring the first fixing member 5 and the second fixing member 6 to fix the elastic member 4 to the yoke 21, firstly the first fixing member 5 and the second fixing member 6 can be fixedly welded to the yoke 21, and then the elastic member 4 can be fixedly welded to the first fixing member 5 and the second fixing member 6, which reduces the processing difficulty of fixing the elastic member 4 to the yoke 21, thereby making it easy to process.

Compared with the related technology, in the vibration motor of the present disclosure, by configuring the elastic member as a U-shape and, at the same time, fixing the first fixing portion and the second fixing portion of the elastic member to the vibrator, and fixing the third fixing portion to the shell, so that the vibrator is fixed to the elastic member firmly, thereby allowing the vibration motor to vibrate stably. By configuring the first fixing member and the second fixing member for fixing the elastic member to the vibrator, and the third fixing member for fixing the elastic member to the shell, so that the elastic member can be prevented from being directly fixed to the vibrator and the shell, thereby making the vibration motor easy to process.

It should be noted that, the above are merely embodiments of the present invention, those skilled in the art can make improvements without departing from the inventive concept of the present invention, however, these improvements shall belong to the protection scope of the present invention.

What is claimed is:

1. A vibration motor, comprising:
a shell,
a vibrator accommodated in the shell,
a stator accommodated in the shell, and
an elastic member suspending the vibrator in the shell;
wherein one of the vibrator and the stator comprises a magnetic circuit unit, and the other one of the vibrator and the stator comprises a coil,
wherein the elastic member is a sheet-like spring, and a plane where the elastic member is located is perpendicular to a vibrating direction of the vibrator; the elastic member is of a U-shape, and comprises a first fixing portion and a second fixing portion which are respectively fixed to the vibrator and spaced from each other, a third fixing portion located between the first fixing portion and the second fixing portion and fixed to the shell, a first deforming portion which connects the third fixing portion with the first fixing portion, and a second deforming portion which connects the third fixing portion with the second fixing portion, two elastic members are provided, the third fixing portions corresponding to the two elastic members are arranged directly facing each other, and the first deforming portion and the second deforming portion of two elastic members are parallel to and spaced from each other.

2. The vibration motor as described in claim 1, wherein the vibration motor further comprises a first fixing member fixedly connecting the first fixing portion with the vibrator, a second fixing member fixedly connecting the second fixing portion with the vibrator, and a third fixing member fixedly connecting the third fixing portion with the shell.

3. The vibration motor as described in claim 2, wherein the first fixing portion is fixedly welded to the first fixing member, the second fixing portion is fixedly welded to the second fixing member, the third fixing portion is fixedly welded to the third fixing member.

4. The vibration motor as described in claim 1, wherein the vibrator comprises a yoke accommodated in the shell and a magnet fixed to the yoke, the coil is fixed to the shell and arranged by winding the magnet;
and the two elastic members are respectively fixed to a side of the yoke, the side of the yoke faces away from the coil.

5. The vibration motor as described in claim 4, wherein the first deforming portion of any one of the two elastic members is located between the first deforming portion of the other one of the two elastic members and the second deforming portion of the other one of the two elastic members.

6. The vibration motor as described in claim 4, wherein the vibration motor further comprises a pole plate fixed to the magnet, and the pole plate is located at a side of the magnet, and the side of the magnet faces away from the yoke.

7. The vibration motor as described in claim 1, wherein the shell comprises a housing and a cover plate which covers the housing; the housing and the cover plate together form containing space;

the yoke comprises a main portion fixedly connected with the magnet, a first bending portion and a second bending portion respectively bending and extending from two opposite sides of the main portion in a direction to the cover plate, and a first extending portion and a second extending portion respectively extending from two ends of the first bending portion and the second bending portion in a direction to the housing; the first fixing portion is fixed to the first extending portion, and the second fixing portion is fixed to the second extending portion.

8. The vibration motor as described in claim 7, wherein the yoke further comprises two side walls respectively bending and extending from two opposite sides of the main portion in a direction to the cover plate, the coil is clamped between two side walls.

9. The vibration motor as described in claim 7, wherein the housing comprises a bottom plate and a side plate surrounding a periphery of the bottom plate, and the side plate is provided separately from the bottom plate.

\* \* \* \* \*